United States Patent [19]

Kagoshima et al.

[11] Patent Number: 5,274,006
[45] Date of Patent: Dec. 28, 1993

[54] FOAMABLE EPOXY RESIN COMPOSITION

[75] Inventors: Yutaka Kagoshima; Toshio Nagase; Takamitu Mikuni, all of Kawasaki; Takeo Kobayashi, Tokyo, all of Japan

[73] Assignee: Nippon Zeon Co., Ltd., Tokyo, Japan

[21] Appl. No.: 836,600

[22] Filed: Feb. 18, 1992

[30] Foreign Application Priority Data

Feb. 19, 1991 [JP] Japan .................. 3-046063

[51] Int. Cl.$^5$ .............................. C08J 9/08; C08J 9/10
[52] U.S. Cl. ........................................ 521/85; 521/54; 521/92; 521/94; 521/95; 521/104; 521/128; 521/129; 521/135
[58] Field of Search ............... 521/135, 104, 128, 129, 521/135, 85, 94, 95, 54

[56] References Cited

U.S. PATENT DOCUMENTS

| | | | |
|---|---|---|---|
| 2,825,282 | 3/1958 | Gergen et al. | 521/135 |
| 2,958,905 | 11/1960 | Newberg et al. | 521/135 |
| 2,959,508 | 11/1960 | Graham et al. | 521/135 |
| 3,240,736 | 3/1966 | Beckwith | 521/135 |
| 3,383,337 | 5/1968 | Garling | 521/135 |
| 3,464,948 | 9/1969 | Russell | 521/135 |
| 3,864,181 | 2/1975 | Wolinski et al. | 521/135 |
| 3,923,922 | 12/1975 | Grant | 521/135 |

FOREIGN PATENT DOCUMENTS

| | | |
|---|---|---|
| 0030668 | 6/1981 | European Pat. Off. |
| 1080774 | 4/1960 | Fed. Rep. of Germany |
| 932497 | 7/1963 | United Kingdom |

OTHER PUBLICATIONS

World Patents Index AN-79-62056B (JP-54-086562).
World Patents Index AN-80-80033C (JP-55-125126).
World Patents Index Latest AN-82-72981E (JP-57-117542).

Primary Examiner—Morton Foelak
Attorney, Agent, or Firm—Sherman and Shalloway

[57] ABSTRACT

The present invention provides a foamable epoxy resin composition (A) 100 parts by weight of a liquid epoxy resin (B) 0.5-20 parts by weight of a latent curing agent, (C) 0.5-15 parts by weight of a foaming agent having a decomposition temperature of 100°-220° C., (D) 0.05-5 parts by weight of a surface active agent and (E) 10-200 parts by weight of a rubbery elastomer or a powdery halogen-free thermoplastic resin of 150 μm or less in average particle diameter, which composition has a melt viscosity of $2.5 \times 10^3 - 5 \times 10^4$ dPa·s at the decomposition temperature of said foaming agent. The composition can provide a foamed material of rigidity and good heat resistance, having an expansion ratio of 5 times or more and a dense cell structure of 0.5 mm or less in average cell diameter.

5 Claims, No Drawings

FOAMABLE EPOXY RESIN COMPOSITION

The present invention relates to a novel foamable epoxy resin composition. More particularly, the present invention relates to a liquid or paste-like foamable composition using an thermosetting epoxy resin as a base, which composition can easily provide a dense foamed material suitable usable in such application fields as automobiles, vehicles, household electric appliances, building materials and the like.

It is generally known that in automobiles, the fuel consumption can be improved by about 1% by reducing the body weight by 1%. Hence, since the first oil shock of 1973, use of lightweight body in automobiles for improvement of the fuel consumption has become an important task in automobile designing, and it has been studied and adopted to, for example, use a plastic outer panel, an aluminum member, a high-tensile-strength steel plate, various reinforcing members, lightweight parts, etc. Improvement of automobile fuel consumption has become more necessary recently in connection with measures for global warming, and making the automobile body weight further lighter has therefore become an urgent task.

Various measures therefor have been taken. For example, a lightweight honeycomb composite panel obtained by adhering two steel plates to a paper honeycomb core in a sandwich structure is used in a honeycomb roof, etc. in order to achieve lightweightness and high rigidity (the paper honeycomb core also has a sound insulating property and a damping property), and a panel comprising a steel plate and a foamed asphalt bonded thereto was developed and is actually used for the same purpose as above.

However, development of a smaller engine capable of producing the same horse power per liter of fuel, development of a body of lighter weight, further reduction in air resistance, etc. are reaching respective limits, and significant improvement of automobile weight from automobile structural aspect is virtually difficult now.

The optimum measures for lighter weight is to use a thinner body panel. The thinner body panel, however, results in reduced body strength, deterioration of sound insulating property and damping property, etc., inviting unfavorable matters. Meanwhile, it is known that a plastic material having a dense porous structure of 0.5 mm or less, preferably 0.3 mm or less in average cell diameter and an expansion ratio of generally 5 times or more is best suited as a material of lightweightness and rigidity; hence a foamed plastic material of the above structure having adhesivity has come to be widely used as a reinforcing material for enhancing the surface rigidity of thinner steel outer panel.

For production of a hard foamed material from a liquid raw material, various processes are known, such as (1) a process wherein a foaming agent capable of generating a gas when heat-decomposed is added to obtain a foamed material, (2) a process wherein foaming is caused by mechanical stirring in the presence of a foam stabilizer to obtain a foamed material (U.S. Pat. No. 4,546,118 and U.S. Pat. No. 992,525), and (3) a process wherein hollow fine particles are mixed to obtain a foamed material (Japanese Patent Application Laid-Open No. 19033/1985, U.S. Pat. Nos. 4,410,639 and 4,605,688).

As the process (1), there were proposed, for example, a process, wherein a composition comprising a vinyl chloride resin, an epoxy resin and a foaming agent is heat-treated (Japanese Patent Application Laid-Open No. 272515/1988) and a process wherein a heat-shrinkable polymer sheet containing a foaming agent is laminated onto a fiber substrate and the laminate is heat-treated (Japanese Patent Application Laid-Open No. 159269/1981). However, the former process has a fear in that the resin contained in the foamed material may undergo thermal decomposition at high-temperature steps in automobile production line, such as electrocoating step and the like; and the latter process has a drawback in that the foamed material layer is as thin as 0.5 mm or less and accordingly inferior in damping property and sound insulating property.

In the process (2), air, a freon gas or the like is trapped into a liquid composition in the presence of a foam stabilizer such as silicone type, by the means of a mechanical shear force by a mixer or a whipper. However, the process has a drawback in that bubbles give rise to a drainage phenomenon during the curing step of foamed material and collapse, making it difficult to obtain a dense foamed material having a density of generally 0.2 g/cc or less and an average cell diameter of 0.3 mm or less.

The process (3) has a serious drawback in that the composition before foaming generally incurs viscosity increase making the coating, etc. difficult.

Under the above situation, the object of the present invention is to provide a liquid material which can provide a light, rigid and dense foamed material, which can be strongly adhered even to an anti-rust oil treated metal and which has good heat resistance and can be applied in, for example, automobile production, before the electrocoating step.

The present inventors made study and found that the above object can be met by a foamable epoxy resin composition comprising a liquid epoxy resin, a latent curing agent for epoxy resin, a foaming agent having a particular decomposition temperature, a surface active agent and a particular rubbery elastomer or a particular powdery thermoplastic resin in given proportions, which composition has a melt viscosity of particular range at the decomposition temperature of the foaming agent.

According to the present invention, there is provided a foamable epoxy resin composition comprising (A) 100 parts by weight of a liquid epoxy resin having at least one epoxy group in the molecule, (B) 0.5–20 parts by weight of a latent curing agent for epoxy resin, (C) 0.5–15 parts by weight of a foaming agent having a decomposition temperature of 100°–220° C., (D) 0.05–5 parts by weight of a surface active agent, and (E) 10–200 parts by weight of at least one polymer selected from (a) rubbery elastomers insoluble in said epoxy resin at room temperature but miscible with and dispersible in said epoxy resin at temperature of 80°–150° C. and (b) powdery halogen-free thermoplastic resins of 150 $\mu$m or less in average particle diameter, which composition has a melt viscosity of $2.5 \times 10^3$–$5 \times 10^4$ dPa·s at the decomposition temperature of said foaming agent.

In the present composition, the liquid epoxy resin used as the component (A) has at lease one epoxy group in the molecule. Such a liquid epoxy resin includes, for example, (1) a diglycidyl ether using bisphenol A, bisphenol F or resorcin as a base, (2) a polyglycidyl ether of a phenolic novolac resin or a cresol novolac resin, (3) a diglycidyl ether of hydrogenated bisphenol A, (4) a glycidylamine type, (5) a linear aliphatic epoxide type and (6) a diglycidyl ester of phthalic acid, hexahydrophthalic acid or tetrahydrophthalic acid, all having an epoxy equivalent of preferably 100-300.

These liquid epoxy resins can be used alone or in combination of two or more. They may be used in combination with a flexible epoxy resin such as ethylene oxide- or propylene oxide-added bisphenol A type epoxy resin, dimer acid type epoxy resin, epoxy-modified NBR or the like in order to impact toughness to the foamed material obtained.

In the present composition, a latent curing agent for epoxy resin is used as the component (B). This curing agent preferably gives the exothermic temperature of 100°-200° C. when combined with an epoxy resin. Such a latent curing agent includes, for example, imidazole derivatives such as dicyandiamide, 4,4'-diaminodiphenyl sulfone, 2-n-heptadceylimidazole and the like; isophthalic acid dihydrazide; N,N-dialkylurea derivatives; N,N-dialkylthiourea derivatives; acid anhydrides such as tetrahydrophthalic anhydride and the like; isophoronediamine; m-phenylenediamine; N-aminoethylpiperazine; boron trifluoride complex compounds; and trisdimethylaminomethylphenol.

These curing agents can be used alone or in combination of two or more. The amount of curing agent used must be selected within the range of 0.5-20 parts by weight per 100 parts by weight of the component (A), i.e. the liquid epoxy resin. When the amount is less than 0.5 part by weight, the resulting composition is not cured sufficiently and gives a foamed material of insufficient rigidity. When the amount is more than 20 parts by weight, the rigidity of foamed material does not increase in proportion to the increase in said amount; such an amount is therefore uneconomical.

The exothermic temperature used herein refers to such a temperature of heating medium when an epoxy resin and a curing agent are mixed at room temperature and the resulting mixture is subjected to temperature elevation using a heating medium such as oil bath, heater or the like and thereby is cured to give the maximum heat generation. The preferable combination and amounts of the epoxy resin and the curing agent suitable for the heating conditions employed can easily be determined in advance by testing.

In the present invention, together with the component (B), i.e. the curing agent, there can be used, as necessary, a curing accelerator such as alcohol type, phenol type, mercaptan type, dimethylurea type, alicyclic type, imidazole, monuron, chlorotoluene or the like.

In the present composition, a foaming agent of high-temperature decomposition and foaming type having a decomposition temperature of 100°-220° C. is used as the component (C). As such a foaming agent of high-temperature decomposition and foaming type, there can be used an organic foaming agent, an inorganic foaming agent, microcapsules of high-temperature expansion type, etc. When a foaming agent having a decomposition temperature lower than 100° C. is used, foaming starts already at the time of sheeting, or the melting of resin is insufficient at the time of foaming in a heating oven, causing gas leakage and insufficient expansion ratio or making it difficult to obtain a uniform foamed material. Meanwhile, when the decomposition temperature is more than 200° C., the composition containing a foaming agent having such a high decomposition temperature must be processed at a correspondingly high temperature, causing deteriotation and making it difficult to obtain a foamed material of good quality.

The organic foaming agent includes, for example, azodicarbondiamide, p-toluenesulfonyl hydrazide, dinitrosopentamethylenetetramine and 4,4'-oxybisbenzenesulfonyl hydrazide. The decomposition temperature of these organic foaming agents can be controlled desirably by adding thereto urea, a zinc compound, a lead compound or the like. The inorganic foaming agent incudes, for example, sodium hydrogencarbonate and sodium boron hydride. The microcapsules of high-temperature expansion type include, for example, microcapsules comprising a vinylidene chloride resin and a low-boiling hydrocarbon encapsulated therein.

In the present invention, there can be used any of an organic foaming agent, an inorganic foaming agent and microcapsules of high-temperature expansion type. However, an organic foaming agent is preferable in view of the expansion ratio, economy, etc. These foaming agents can be used alone or in combination of two or more. The amount of foaming agent used is selected in the range of 0.5-15 parts by weight per 100 parts by weight of the component (A), i.e. the liquid epoxy resin. When the amount is less than 0.5 part by weight, foaming is insufficient. When the amount is more than 15 parts by weight, the expansion ratio does not increase in proportion to the increase in said amount, and such an amount is uneconomical.

A foaming agent consisting of particles of smaller diameters is preferable in order to obtain a dense foamed material having a uniform cell diameter and a rigid cell wall. For example, in order to obtain a foamed material having an optimum cell diameter of 0.1-0.6 mm, preferably about 0.3 mm, it is desirable to use a foaming agent having uniform particle diameters of 20 $\mu$m or less preferably 10 $\mu$m or less.

In the present composition, together with the foaming agent, there can be used, as necessary, a foaming accelerator. Such a foaming accelerator includes, for example, zinc oxide, lead stearate, calcium stearate, zinc stearate, barium stearate, a sodium or potassium compound and urea.

In the present composition, a surface active agent can be used as the component (D). The surface active agent has a role of giving a better cell structure. Preferable as the surface active agent are anionic surface active agents such as salt of alkyl sulfate (e.g. sodium lauryl sulfate, sodium myristyl sulfate), salt of alkylarylsulfonic acid (e.g. sodium dodecylbenzenesulfonate, potassium dodecylbenzenesulfonate), salt of sulfosuccinic acid ester (e.g. sodium dioctyl sulfosuccinate, sodium dihexyl sulfosuccinate), salt of aliphatic acid (e.g. ammonium laurate, potassium stearate), salt of polyoxyethylene alkyl sulfate, salt of polyoxyethylene alkyl aryl sulfate, salt of resin acid and the like. Needless to say, there can also be used nonionic surface active agents such as sorbitan ester (e.g. sorbitan monooleate, polyoxyethylene sorbitan monostearate), polyoxyethylene alkyl ether, polyoxyethylene alkyl phenyl ether, polyoxyethylene alkyl ester and the like, and cationic surface active agents such as cetylpyridinium chloride, cetyltrimethylammonium bromide and the like.

These surface active agents can be used alone or in combination of two or more. The amount of surface active agent used is selected in the range of 0.05-5 parts by weight, preferably 0.2-3.0 parts by weight per 100 parts by weight of the component (A), i.e. the liquid epoxy resin. The surface active agent can be advantageously added by spraying it on a rubbery elastomer or a thermoplastic resin as the component (E) and drying to allow it to be uniformly adsorbed by the component (E).

In the present composition, there can be used, as the component (E), a rubbery elastomer or a halogen-free thermoplastic resin, each insoluble in the component (A), i.e. the epoxy resin at room temperature but miscible with and dispersible in the epoxy resin at temperatures of 80°-150° C. The rubbery elastomer can be a solid (powdery, mass, etc.) or a highly viscous liquid. Meanwhile, the thermoplastic resin must be powdery and have an average particle diameter of 150 μm or less. A preferable rubbery elastomer or thermoplastic resin is an elastomer or resin capable, when the composition is heated to a temperature of 150° C. or higher, of being melted to form an intimate mixture with the component (A) (epoxy resin) and further capable of maintaining the melt viscosity of the composition stably. Such an elastomer or resin includes rubbery elastomers such as chloroprene rubber, butadiene-acrylonitrile rubber, carboxyl-modified butadiene-acrylonitrile rubber, epoxy-modified butadiene-acrylonitrile rubber, butadiene rubber, isoprene rubber and the like, and thermoplastic resins such as ethylene-vinyl acetate copolymer, polyphenylene ether, ethylene-vinyl alcohol copolymer, acrylonitrile-styrene coolymer, polyamide, polyvinyl butyral, polyvinyl acetal, polymethyl methacrylate, acrylonitrile-butadiene-styrene copolymer, methyl methacrylate-butadiene-styrene copolymer, polystyrene and the like. These elastomers and resins can be used alone or in combination of two or more.

The component (E) has not only a role of controlling the melt viscosity of the composition but also a role of imparting toughness to the foamed material obtained. In the present composition, the amount of component (E) used is selected in the range of 10-200 parts by weight per 100 parts by weight of the component (A) (liquid epoxy resin).

In the present composition, the degree of affinity between the component (A) (epoxy resin) and the component (E) (rubbery elastomer or thermoplastic resin) is important, and the type, molecular weight, particle diameters, amount used, etc. of the component (E) must be selected appropriately. With respect to said degree of affinity, it is not preferable that the polymers be completely compatible with each other during melting, and the polymers are preferably in a state of stable dispersion and mixing. Hence, depending upon the combination of the polymers, it is desirable that a plasticizer be added to increase the affinity between the polymers and thereby control the affinity.

The plasticizer has also a role of controlling the melt viscosity of the composition. As the plasticizer there can be used those conventionally known, such as phthalic acid ester (e.g. dioctyl phthalate, dibutyl phthalate), phosphoric acid ester (e.g. tricresyl phosphate), aliphatic acid ester (e.g. dioctyl adipate), adipic acid condensate of ethylene glycol, trimellitic acid triester, glycol acid ester, chlorinated paraffin, alkylbenzene and the like.

In the present composition, a diluent for epoxy resin can be compounded as necessary in order to make easy initialstage mixing and enable the use of filler, etc. in increased amounts. Such a diluent includes reactive diluents, such as butyl glycidyl ether, allyl glycidyl ether, phenyl glycidyl ether, cresyl glycidyl ether, and the like, as well as non-reactive diluents such as dibutyl phthalate, dioctyl phthalate, butyl benzyl phthalate, tricresyl phosphate, acetyl tributyl citrate, aromatic process oil, pine oil, 2,2,4-trimethyl-1,3-pentanediol diisobutyrate and the like. These diluents are used in the range of ordinarily 5-150 parts by weight, preferably 10-120 parts by weight per 100 parts by weight of the component (A) (liquid epoxy resin).

In the present composition, a thixotropic agent and a filler can be added as necessary in order to control the processability and coating property (e.g. viscosity) of the composition or increase its volume for reducing the cost. Further, a pigment, etc. may be added.

The thixotropic agent includes, for example, silicic acid types such as silicic acid anhydride, hydrous silicic acid and the like; bentonite types such as organic bentonite and the like; asbestos types such as SILODEX and the like; and organic types such as dibenzylidene sorbitol and the like. These thixotropic agents are sued in the range of ordinarily 1-20 parts by weight per 100 parts by weight of the component (A) (liquid epoxy resin).

The filler includes, for example, calcium carbonate, mica, talk, kaolin, clay, Celite, asbestos, pearlite, baryta, silica, siliceous sand, flaky graphite, dolomite, lime stone, fine aluminum powder and the like. The pigment includes, for example, titanium dioxide, litharge, lithopone, zinc oxide and carbon black.

The foamable epoxy resin composition of the present invention can be prepared by mixing the components (A), (B), (C), (D) and (E) as the essential components and the abovementioned optional components in desired amounts using a planetary mixer, a kneader, rolls, a Henschel mixer or the like.

The thus prepared foamable epoxy resin composition of the present invention must have a melt viscosity of $2.5 \times 10^3 - 5 \times 10^4$ dPa·s at the decomposition temperature of the foaming agent contained therein. When the melt viscosity is outside the range, the resulting composition is unable to give a foamed material having good appearance, an expansion ratio of 5 times or more and an average cell diameter of 0.5 mm or less and small in slippage caused by vertical foaming.

The present composition can give a dense, tough and heat-resistant epoxy resin type foamed meterial having an expansion ratio of 5 times or more and an average cell diameter of 0.5 mm or less, by heating the composition to 140°-200° C. to give rise to decomposition of foaming agent and curing reaction of epoxy resin simultaneously according to a known thermal molding method such as plastisol processing method, calendering, extrusion or the like.

When the foamable epoxy resin composition of the present invention is used as a reinforcing material, a heat insulating material, a damping material, etc. for outer panels of automobiles, the composition can be applied most efficiently by (a) first molding the composition into a nonfoamed sheet having adhesivity, at a temperature lower than the decomposition temperature of the foaming agent contained n the composition, (b) cutting sheet into a desired shape, (c) adhering the cut sheet to a material which is resistant to heating and which is to be improved in property (e.g. strength or the like), at the production site of intended material and (d) heating the resulting laminate to give rise to foaming and curing of the epoxy resin contained in the composition, to adhere the foamed material strongly to the material to be improved in property and allow the foamed material to have sufficient rigidity. Such an application method can be employed also when the present composition is applied to a metallic thin plate of large area for the purposes of reinforcement, heat insulation, damping, etc.

When the present composition is used for outer panels of automobiles, it can be applied even at the step before electrocating, in automobile production line and thus has wide applications.

In the present composition, the gas generated by the decomposition of the foaming agent can be maintained stably in a state of dense bubbles, allowing the curing of epoxy resin under a variety of conditions, and moreover the foamed composition can maintain a high apparent viscosity even under heating; therefore, the composition can be applied even to a vertical surface or on a ceiling without dripping and the curing of epoxy resin can proceed as desired. Further, the present composition, containing a thermoplastic resin or a rubbery elastomer, has very high adhesivity to an anti-rust oil treated metal.

Furthermore, the present composition can be directly coated on an intended material or directly filled into the gaps of a material having gaps.

The present invention is hereinafter described in more detail by way of Examples. However, the present invention is by no means restricted by these Examples.

Incidentally, measurements of properties were made as follows.

(1) Melt viscosity

The melt viscosity of composition was measured using Rheometrics Dynamic Spectrometer (a product of Rheometrics Co.) and parallel plates (40 mmφ) under the conditions of 1 Hz (frequency), 1 mm (gap between plates), 10° C./min (temperature elevation rate) and 150° C. (measurement temperature).

(2) Anti-slippage when composition is subjected to vertical foaming

A composition was molded at a temperature below the decomposition temperature of the foaming agent contained in the composition, to prepare a non-foamed sheet. The sheet was vertically kept and heated to give rise to foaming. The degree of slippage generated between the substrate and the foamed material was examined in accordance with the following yardstick. The conditions for heating to give rise to foaming were 150° C.×20 minutes in Example 1 and 200° C.×20 minutes in other Examples.

⊚: No slippage
○: Slight slippage
Δ: Considerable slippage
X: Significant slippage (3) The following rubbery elastomers and thermoplastic resins were used.

MMA-EA copolymer
   Agglomerates of 30 μm in average diameter, of primary particles of 0.3 μm in average diameter.
Ethylene-vinyl acetate copolymer
   Average particle diameter: 120 μm
Epoxy-modified NBR
   A liquid having a melt viscosity of 28,000 dPa·S.
Vinyl chloride-vinyl acetate copolymer
   A powder of 16 μm in average diameter, consisting of primary particles of 0.9 μm in average diameter and agglomerates thereof.

EXAMPLE 1

The components of the types and amounts shown in Table 1 were mixed at room temperature using a planetary mixer, to prepare a foamable composition. The composition was coated on a release paper in a thickness of 2.0 mm using an applicator. The coated paper was heated for 3 minutes in a circulating hot air oven of 110° C. to prepare a non-foamed adhesive type.

The non-foamed adhesive tape was laminated onto a steel plate of 0.8 mm in thickness; the release paper was peeled; the resulting laminate was adhered to a glass cloth of 150 μm; the resulting material was heated for 20 minutes in a circulating hot air oven of 150° C. to prepare a lightweight steel plate composite material wherein a hard foamed material made from the present composition was sandwiched in between a steel plate and a glass cloth.

The foamed material layer of the composite material was cut to measure the foamability, average bubble (cell) diameter and expansion ratio. The foamability was measured by observing the cut surface and was rated as ⊚ when the cells were uniform and independent, as ○ when the cells were partly contiguous, as when Δ the cells were considerably contiguous, and as X when the cells were substantially contiguous. The average cell diameter was measured for the cells other than those directly contacting with the steel plate and the glass cloth. The expansion ratio was obtained by dividing the thickness of the foamed material by the thickness of the foamable composition coated.

The results are shown in Table 1.

Similar results were obtained when the present composition was coated directly on the glass cloth, not on the release paper.

EXAMPLE 2

The procedure of Example 1 was repeated except that the amount of dicyandiamide was changed to 3 parts by weight, no curing accelerator was used and the foaming and curing temperature was changed to 200° C. The results are shown in Table 1.

As is clear from Table 1, a foamed material having a high expansion ratio, rigidity and fine cells can be obtained even at high temperatures.

EXAMPLE 3

The components of the types and amounts shown in Table 1 were mixed using a Henschel mixer to prepare a composition. The composition was coated on a release paper in a thickness of 2.0 mm by T-die extrusion. The subsequent procedure was the same as in Example 1 except that the heating and foaming conditions were 200° C. and 20 minutes. The results are shown in Table 1.

EXAMPLES 4-6

Using the components of the types and amounts shown in Table 1, the procedure of Example 3 was repeated The results are shown in Table 1.

As is clear from Table 1, each of the present compositions provides a foamed material of good foamability having an average cell diameter of 0.4 mm or less and an expansion ratio of 5 times or more and is superior in anti-slippage when subjected to vertical foaming.

TABLE 1

|  | Example | | | | | |
|---|---|---|---|---|---|---|
|  | 1 | 2 | 3 | 4 | 5 | 6 |
| Formulation of composition (parts by weight) | | | | | | |
| (A) Bisphenol A-based epoxy resin | 140 | 100 | 100 | 100 | 100 | 100 |
| (B) Dicyandiamide | 10 | 3 | 3 | 3 | 3 | 3 |
| (C) Azodicarbonamide | 5 | 5 | 5 | 5 | 5 | 5 |
| (D) Anionic surface active agent | 0.5 | 0.5 | 0.5 | 0.5 | 0.5 | 0.5 |
| (E) MMA-EA copolymer | 100 | 100 | — | — | 30 | 150 |
| Ethylene-vinyl acetate copolymer | — | — | 100 | — | — | — |
| Epoxy-modified NBR | — | — | — | 100 | — | — |
| Dimethylurea type curing accelerator | 3 | — | — | — | — | — |
| Dibutyl phthalate | 30 | 30 | 30 | 30 | 30 | 30 |
| Ba- and Zn-containing organic foaming accelerator | 3 | 3 | 3 | 3 | 3 | 3 |
| Heavy calcium carbonate | 30 | 30 | 60 | 30 | 50 | 30 |
| AEROSIL | 5 | 5 | 5 | 5 | 5 | 5 |
| Melt viscosity (dPa · s) | 26000 | 21000 | 19000 | 7800 | 3200 | 4400 |
| Foaming property | | | | | | |
| Foamability (appearance of cell) | ⊚ | ⊚ | ⊚ | ⊚ | ○ | ○ |
| Average cell diameter (mm) | 0.2 | 0.2 | 0.2 | 0.2 | 0.4 | 0.4 |
| Expansion ratio (times) | 6.5 | 8.0 | 7.5 | 7.2 | 6.1 | 5.6 |
| Anti-slippage when composition is * | ⊚ | ⊚ | ⊚ | ○ | ○ | ⊚ |

* subjected to vertical foaming

COMPARATIVE EXAMPLES 1-6

The procedure of Example 3 was repeated using the components of the types and amounts shown in Table 2. The results are shown in Table 2.

Comparative Example 1 is a case in which a vinyl chloride-vinyl acetate copolymer was used as a thermoplastic resin. The copolymer of Comparative Example 1 underwent thermal decomposition at the heating and foaming conditions of 200° C. and 20 minutes.

Comparative Example 2 is a case in which the amount of thermoplastic resin used was larger than in Example 6 and the melt viscosity of composition was higher than the range of the present invention. The composition of Comparative Example 2 gave a foamed material of low expansion ratio and inferior foamability.

Comparative Example 3 is a case in which the amount of filler used was larger than in Example 4 and the melt viscosity of composition was higher than the range of the present invention. The composition of Comparative Example 3 also gave a foamed material of low expansion ratio and inferior foamability.

Comparative Example 4 is a case in which the amounts of filler and thermoplastic resin used were each smaller than in Example 5 and the melt viscosity of composition was lower than the range of the present invention. The composition of Comparative Example 4 gave a foamed material slightly inferior in foamability as well as in slippage caused by vertical foaming.

Comparative Example 5 is a case which is Example 5 minus the surface active agent. The composition of Comparative Example 5 gave a foamed material of average cell diameter larger than 0.5 mm slightly poor in foamability as well as in slippage caused by vertical foaming.

Comparative Example 6 is a case in which neither thermoplastic resin nor rubbery elastomer was used. The composition of Comparative Example 6 gave poor foaming and produced a foamed material containing cells of large and different sizes.

TABLE 2

|  | Comparative Example | | | | | |
|---|---|---|---|---|---|---|
|  | 1 | 2 | 3 | 4 | 5 | 6 |
| Formulation of composition (parts by weight) | | | | | | |
| (A) Bisphenol A-based epoxy resin | 100 | 100 | 100 | 100 | 100 | 100 |
| (B) Dicyandiamide | 10 | 3 | 3 | 3 | 3 | 3 |
| (C) Azodicarbonamide | 5 | 5 | 5 | 5 | 5 | 5 |
| (D) Anionic surface active agent | 0.5 | 0.5 | 0.5 | 0.5 | 0.5 | 0.5 |
| (E) MMA-EA copolymer | — | 200 | — | 20 | 30 | — |
| Ethylene-vinyl acetate copolymer | — | — | — | — | — | — |
| Epoxy-modified NBR | — | — | 100 | — | — | — |
| Vinyl chloride-vinyl acetate copolymer | 100 | — | — | — | — | — |
| Dimethylurea type curing accelerator | — | — | — | — | — | — |
| Dibutyl phthalate | 30 | 10 | 10 | 30 | 30 | — |
| Ba- and Zn-containing organic foaming accelerator | 3 | 3 | 3 | 3 | 3 | 3 |
| Heavy calcium carbonate | 30 | 30 | 100 | 50 | 50 | 50 |
| AEROSIL | 5 | 5 | 10 | — | 5 | 5 |
| Ca- and Zn-containing heat stabilizer | 3 | — | — | — | — | — |
| Melt viscosity (dPa · s) | 26000 | 96000 | 77000 | 2400 | 3200 | 2850 |
| Foaming property | | | | | | |
| Foamability (appearance of cell) | X(Heat-decomposed) | X | X | Δ | Δ | X |
| Average cell diameter (mm) | 0.5 | 0.5 | 0.4 | 0.5 | 0.6 | >1.5 |
| Expansion ratio (times) | 6.6 | 3.6 | 4.4 | 6.1 | 6.2 | 5.9 |
| Anti-slippage when composition is * | ○ | ○ | ○ | X | Δ | X |

* subjected to vertical foaming

The foamable epoxy resin composition of the present invention can easily provide a foamed material of rigidity and good heat resistance, having an expansion ratio of 5 times or more and a dense cell structure of 0.5 mm or less in average cell diameter, and can therefore be used suitably in fields such a s automobiles, vehicles, household electric appliances, building materials and the like, as materials such as lightweight reinforcing material, heat-insulating material, buffer material, packaging material, damping material, sealing material, floating material, absorbent material and the like. Having good heat resistance, the present composition can be particularly advantageously used as a reinforcing material for outer panel of automobile body, in a step before electrocoating.

What is claimed is:

1. A foamable epoxy resin composition comprising
   (A) 100 parts by weight of a liquid epoxy resin having at least one epoxy group in the molecule,
   (B) 0.5–20 parts by weight of a latent curing agent for epoxy resin selected from the group consisting of an imidazole, an isophthalic acid dihydrazide, an N,N-dialkylurea, an N,N-dialkylthiourea, tetrahydrophthalic anhydride, isophoronediamine, m-phenylene diamine, N-aminoethylpiperazine, a boron trifluoride complex compound and trisdimethylaminomethylphenol,
   (C) 0.5–15 parts by weight of a foaming agent having a decomposition temperature of 100°–220° C.,
   (D) 0.5–5 parts by weight of an anionic surface active agent, and
   (E) 10–200 parts by weight of at least one rubbery elastomer insoluble in said epoxy resin at room temperature by miscible with and dispersible in said epoxy resin at temperatures of 80°–150° C. and selected from the group consisting of a chloroprene rubber, a butadiene-acrylonitrile rubber, a carboxyl-modified butadiene-acrylonitrile rubber, an epoxy-modified butadiene-acrylonitrile rubber, a butadiene rubber and an isoprene rubber,
   which composition has a melt viscosity of $2.5 \times 10^3$–$5 \times 10^4$ dPa·s at the decomposition temperature of said foaming agent.

2. The composition according to claim 1, wherein the epoxy resin (A) is (1) a diglycidyl ether using bisphenol A, bisphenol F or resorcin as a base, (2) a polyglycidyl ether of a phenolic novolac resin or a cresol novolac resin, (3) a diglycidyl ether of hydrogenated bisphenol A, (4) a glycidylamine type, (5) a linear aliphatic epoxide type or (6) a diglycidyl ester of phthalic acid, hexahydrophthalic acid or tetrahydrophthalic acid and has an epoxy equivalent of 100–300.

3. The composition according to claim 1, wherein the foaming agent (C) is azodicarbonamide, p-toluenesulfonyl hydrazide, dinitrosopentamethylenetetramine, 4,4'-oxybisbenzenesulfonyl hydrazide, sodium hydrogencarbonate, sodium boron hydride or microcapsules comprising a vinylidene chloride resin and a low-boiling hydrocarbon encapsulated therein.

4. The composition according to claim 3, wherein the foaming agent (C) has uniform particle diameters of 20 μm or less.

5. The composition according to claim 1, wherein the rubbery elastomer is powdery.

* * * * *